(12) United States Patent
Pfundstein et al.

(10) Patent No.: US 6,626,274 B2
(45) Date of Patent: Sep. 30, 2003

(54) VIBRATION DAMPER HAVING A REBOUND

(75) Inventors: Wolfgang Pfundstein, Stuttgart (DE); Ralph Samietz, Stuttgart (DE); Reiner Scheu, Hülben (DE)

(73) Assignee: DaimlerChrysler, Stuttgart (DE)

( * ) Notice: Subject to any disclaimer, the term of this patent is extended or adjusted under 35 U.S.C. 154(b) by 0 days.

(21) Appl. No.: 09/825,548

(22) Filed: Apr. 2, 2001

(65) Prior Publication Data

US 2001/0025753 A1 Oct. 4, 2001

(30) Foreign Application Priority Data

Apr. 4, 2000 (DE) .......................... 100 16 641

(51) Int. Cl.⁷ ................................. F16F 9/49
(52) U.S. Cl. ................... 188/284; 188/266.5; 188/280; 188/322.13; 188/300; 267/221; 267/226
(58) Field of Search ................ 188/284, 280, 188/266.1, 266.2, 318, 266.5, 322.13, 288, 315, 322.19, 300; 267/218, 64.15, 64.12, 226, 221; 280/5.503, 6.159, 5.513, 124.161, 5.514, 6.158, 124.158

(56) References Cited

U.S. PATENT DOCUMENTS

| | | | |
|---|---|---|---|
| 3,007,550 A | | 11/1961 | Long, Jr. |
| 4,312,499 A | * | 1/1982 | Wössner et al. .......... 188/284 |
| 4,328,960 A | * | 5/1982 | Handke et al. .......... 188/284 |
| 5,024,301 A | * | 6/1991 | Cook .................. 188/284 |
| 5,219,414 A | * | 6/1993 | Yamaoka .............. 188/284 |
| 6,032,961 A | * | 3/2000 | Pradel et al. .......... 280/5.514 |
| 2001/0025753 A1 | * | 10/2001 | Pfundstein et al. ..... 188/284 |

FOREIGN PATENT DOCUMENTS

| | | |
|---|---|---|
| DE | 66 04 946 | 5/1970 |
| DE | 28 06 540 | 4/1994 |
| DE | 197 31 139 | 2/1999 |
| DE | 196 26 143 | 9/1999 |
| DE | 10016641 | * 10/2001 |
| GB | 812 528 | 4/1959 |

* cited by examiner

Primary Examiner—Douglas C. Butler
(74) Attorney, Agent, or Firm—Kenyon & Kenyon (57) ABSTRACT

A vibration damper includes a rebound, in particular a rebound spring. The vibration damper includes a piston which is formed on an axially movable piston rod and which separates two working chambers in a cylinder, the working chamber penetrated by the piston rod being closed off with a lid and containing the rebound. An out-stroke of the piston rod relative to the cylinder includes an idle-stroke which starts at a minimum out-stroke and in which the rebound does not counteract the piston rod movement, a working-stroke which ends at a maximum out-stroke and in which the rebound counteracts the piston rod movement, and a point of application at which the idle-stroke ends and the working-stroke begins. The vibration damper further includes an arrangement configured to adjust the point of application.

14 Claims, 7 Drawing Sheets

VIBRATION DAMPER HAVING A REBOUND

FIELD OF THE INVENTION

The present invention relates to a vibration damper having a rebound, in particular having a rebound spring.

BACKGROUND INFORMATION

Such a vibration damper is described, for example, in German Published Patent Application No. 196 26 143 and has, on an axially movable piston rod, a piston which separates two working chambers in a cylinder. Throttle orifices are provided for connecting the two working chambers, which orifices can be formed in the piston, for example. The working chamber penetrated by the piston rod is closed off at an axial end with a lid which contains a piston rod guide. In the interior of this working chamber a rebound is arranged which is embodied as a rebound spring arranged concentrically with respect to the piston rod. The piston rod can perform stroke movements relative to the cylinder, namely out-strokes and in-strokes. If the vibration damper is mounted in a vehicle, it is supported on the bodywork of the vehicle and on an assigned vehicle wheel. The out-stroke of the piston rod corresponds to a rebound movement of the associated wheel, while the piston rod is retracted when the wheel experiences compression. As a result of the selected arrangement of the rebound spring in the vibration damper, the out-stroke of the piston rod includes an idle-stroke which starts at a minimum out-stroke and in which the rebound does not counteract the piston movement, a working-stroke which ends at a maximum out-stroke and in which the rebound counteracts the piston rod movement and a point of application at which the idle-stroke ends and the working-stroke begins.

In the conventional vibration damper, the rebound spring is secured at one of its axial ends to the piston and has a supporting ring at its other axial end. During the idle-stroke, the supporting ring is spaced axially apart from the lid of the cylinder. When the point of application is reached, the supporting ring comes to bear against the lid. In the working-stroke range, the rebound spring is supported by its axial ends on the lid and on the piston, as a result of which the rebound spring is stressed and counteracts the extension movement of the piston rod.

British Published Patent Application No. 812 528 also discloses a vibration damper with a rebound spring, the rebound spring being secured by one of its axial ends to the lid and by its other end to a stop piston. This stop piston is mounted so as to be axially adjustable in the cylinder and separates the working chamber penetrated by the piston rod into two component chambers which communicate with one another via an annular orifice formed between the stop piston and the piston rod. A ring which comes to bear against the stop piston at the point of application is formed on the piston of the vibration damper on a side facing the stop piston, the ring sealing the annular opening between the piston rod and stop piston and more or less throttling an exchange of fluid between the component chambers. Thus, the stop piston is supported on the lid not only by the rebound spring but also additionally by the hydraulic volume enclosed between the lid and the stop piston. This measure hydraulically amplifies the mechanical effect of the rebound spring during the working-stroke.

German Published Patent Application No. 28 06 540 discloses a further vibration damper whose rebound spring is supported between a stop piston, arranged in the cylinder, and the lid. A ring which is secured to the piston rod comes to bear against the stop piston at the point of application, as a result of which the stop piston is also moved, during which process the rebound spring is stressed. In an initial region of the working-stroke, the component chambers, separated by the stop piston, of the working chamber penetrated by the piston rod communicate with one another via a bypass. This bypass is embodied so that its passage area changes as a function of the stroke, the passage area being at a maximum at the point of application and decreasing as the out-stroke progresses. Thus, the effect of the rebound spring is increasingly supported hydraulically during the initial region of the working-stroke. The maximum degree of hydraulic support of the effect of the rebound spring occurs when the bypass is closed off.

U.S. Pat. No. 3,007,550 discloses a vibration damper having a rebound spring secured to the cylinder lid and to the piston. Accordingly, the idle travel of the piston rod has the value zero, with the result that the working-stroke occurs over the entire range of the out-stroke and the point of application corresponds to the minimum out-stroke. A secondary cylinder in which a secondary piston is mounted in an axially adjustable fashion is formed in the piston. A throttle gap is provided between the secondary piston and the piston rod and forms part of a throttled flow path through the piston and allows the two working chambers separated by the piston in the cylinder to communicate with one another.

The secondary piston can be adjusted in the secondary cylinder between an open position in which the throttle gap can be flowed through and a closed position in which the throttle gap is shut off. The secondary piston is biased into its open position with a spring arrangement. During an out-stroke, the throttle effect in the throttle gap generates, in the throttle gap, a driving force on the secondary piston which attempts to drive the secondary piston into its closed position. During out-strokes with relatively small stroke speeds, the bias force of the spring arrangement is greater than the throttle effect in the throttle gap, with the result that the secondary piston remains in its open position. However, starting from a certain stroke speed, the throttle effect in the throttle gap exceeds the bias force of the spring arrangement, as a result of which the secondary piston is moved into its closed position and interrupts a further exchange of fluid between the working chambers. The effect of the rebound spring is then supported by the hydraulic volume enclosed between the lid and piston.

In vehicles which are equipped with a ride control device, there is the problem that the rebound of the vibration damper can be configured only for a single ride level in terms of the stroke-dependent effect of the rebound. If, for example, there is an optimum ratio between the spring stiffness, idle-stroke and working-stroke for a normal level, this ratio inevitably changes when a ride level adjustment is performed. For example, the increase in the ride level leads to an out-stroke being set, with the result that the idle-stroke is reduced or becomes a zero. Likewise, the rebound spring may already be biased when this out-stroke occurs.

Problems of this type occur in particular in off-road vehicles if they can be adjusted at least between an on-road level and an off-road level by a ride level control device. A rebound spring which is configured for the on-road level and which has a relatively small idle-stroke for the sake of stable travel dynamics of the vehicle, is generally already biased at the off-road level, as a result of which the off-road capability is affected in terms of the overall spring travel values, the torsion capability of the wheels with respect to one another and in terms of the contact force between the wheel and underlying surface, and is thus adversely affected in terms of the traction of the vehicle. If these disadvantages are eliminated by configuring the rebound spring for the off-road level, an excessively large idle-stroke is produced at the on-road level, as a result of which the dynamic travel stability of the vehicle is significantly reduced.

It is an object of the present invention to provide a vibration damper in which the effect of the rebound is improved at different ride levels.

SUMMARY

The above and other beneficial objects of the present invention are achieved by providing a vibration damper as described herein.

The present invention is based on the principle of configuring a vibration damper so that the point of application of the rebound may be set or adjusted. According to this measure it is possible to set an optimum ratio between the idle-stroke and working-stroke for any desired ride level. In particular, in the case of an off-road vehicle, it is therefore possible to set a point of application for an off-road level which is optimized in terms of the off-road capability, and to set a point of application for an on-road level which is optimized in terms of the dynamic travel stability.

In order to be able to set the ratio between the idle-stroke and working-stroke, the vibration damper according to the present invention includes an arrangement configured to adjust the point of application which may be of any desired configuration.

According to one example embodiment of the present invention, the arrangement configured to adjust the point of application includes an auxiliary piston which is arranged in the cylinder and which is mounted so as to be axially adjustable relative to the piston rod and relative to the cylinder, and by which the rebound is supported directly or indirectly on the lid or on the piston at least during the working-stroke, it being possible to adjust and/or lock the relative position between the auxiliary piston and piston rod or between the auxiliary piston and cylinder. Because the rebound is supported on the auxiliary piston at least during the working-stroke, it is possible to adjust the point of application of the rebound by the adjustment and/or locking of the relative position of the auxiliary piston with respect to the piston rod or with respect to the cylinder. This is because the working-stroke range for the rebound supported on the auxiliary piston starts at the latest when the auxiliary piston is locked relative to the cylinder or relative to the piston rod.

The auxiliary piston may be coupled, for example, to an actuator drive which positions and locks the auxiliary piston either relative to the piston rod, in which case the auxiliary piston is then adjustable relative to the cylinder, or positions and locks the auxiliary piston relative to the cylinder, in which case the auxiliary piston can then be adjusted relative to the piston rod. This actuator drive may include, for example, a spindle drive which interacts with the auxiliary piston.

However, in another example embodiment of the present invention, the auxiliary piston axially separates, in the cylinder in the working chamber penetrated by the piston rod, a first auxiliary chamber from a second auxiliary chamber, a volume adjusting arrangement being provided with which it is possible to adjust the hydraulic volume of that auxiliary chamber in which the auxiliary piston is supported on the lid or on the piston by the hydraulic volume set in the working-stroke range. In this example embodiment, the adjusting and locking of the auxiliary piston, and thus adjusting the point of application of the rebound, are achieved hydraulically. This is of particular advantage because a hydraulic arrangement is available in the cylinder of the vibration damper, with the result that the volume adjusting arrangement can be implemented, for example, with a simple valve arrangement. In addition, such a hydraulic solution has only a low degree of wear, resulting in a high service life for the vibration damper.

It should be appreciated that the features which are mentioned above and are to be explained below can be used not only in the respectively stated combination but also in other combinations or solely without departing from the scope of the present invention.

DETAILED DESCRIPTION

As illustrated in FIGS. 1 to 7, a vibration damper 1 includes a cylinder 2 in which a piston rod 3 is mounted in an axially adjustable fashion. In a lower end section 4 (illustrated in FIG. 1) of the vibration damper 1, the cylinder 2 includes a connecting element 5 with which the vibration damper 1 can be supported, for example, in a wheel bearing of a vehicle wheel. The lower end section 4 contains, in the cylinder 2, a separating piston 6 which separates, in the cylinder 2, a hydraulic chamber 7, filled with hydraulic fluid, from a gas chamber 8 filled with a gas. The separating piston 6 is floatingly mounted in the cylinder 2 in order to perform axial adjusting movements. In an upper end section 9 (also illustrated in FIG. 1 only), the piston rod 3 includes a connecting element 10 with which the vibration damper 1 can be supported on the bodywork of a vehicle. It is also possible to install the vibration damper on a vehicle so that the cylinder 2 is supported on the bodywork of the vehicle and the piston rod 3 is supported on the wheel bearing.

The piston rod 3 extends from the cylinder 2 through a lid 11 of the cylinder 2, the lid 11 containing a piston rod bearing or piston rod guide 12. At that end of the piston rod 3 which is arranged in the cylinder 2, a piston 13 is provided which separates a lower working chamber 14 from an upper working chamber 15 in the hydraulic chamber 7 of the cylinder 2. Throttled flow paths 16 and 17 via which the working chambers 14 and 15 communicate with one another are formed in the piston 13. A rebound 18 which includes a rebound spring is accommodated in the upper working chamber 15, this rebound spring 18 being formed by a helical compression spring which is arranged concentrically with respect to the piston rod 3 and has a circular cross section. Likewise, other embodiments of the rebound 18 are possible, for example, a helical compression spring with a rectangular cross section.

Figure 1:
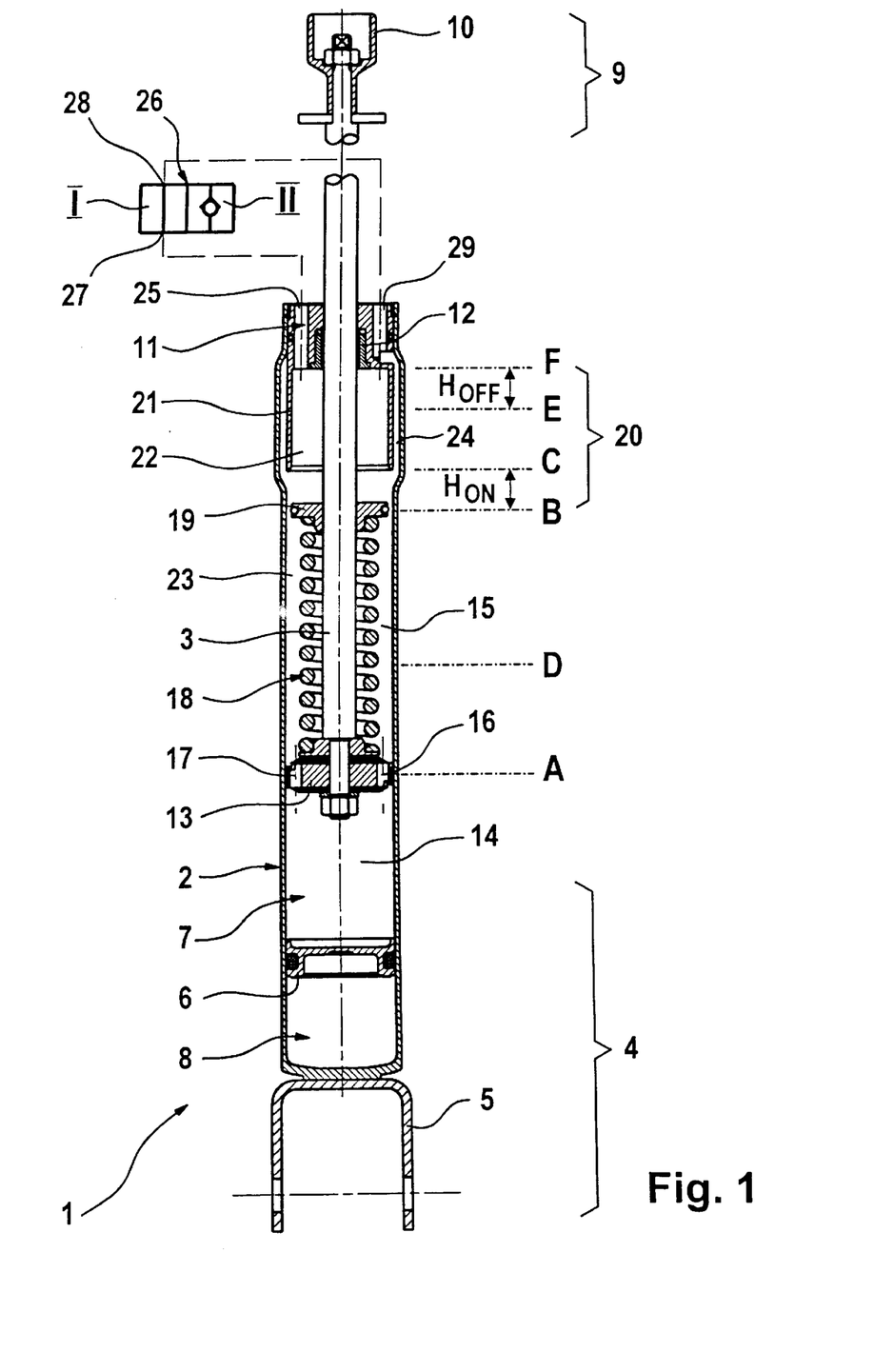
FIGS. 1, 2, 3, 4, 5, 6 and 7 each show a longitudinal section through a respective embodiments of a vibration damper according to the present invention.

As illustrated in FIG. 1, the rebound spring 18 may be mounted on the piston 13 by its end which faces the piston 13. At the end facing away from the piston 13, the rebound spring 18 includes an auxiliary piston 19, the external diameter of which is smaller than the internal diameter of the cylinder 2. In an end section 20 which faces the lid 11 and is indicated by a curly bracket, an auxiliary cylinder 21 is formed in the interior of the cylinder 2, the internal diameter of the auxiliary cylinder 21 being matched to the external diameter of the auxiliary piston 19 so that the auxiliary piston 19 interacts with the cylinder wall of the auxiliary cylinder 21 in a radially sealing fashion. When the auxiliary piston 19 moves into the auxiliary cylinder 21, it accordingly separates, in the upper working chamber 15 penetrated by the piston rod 3, a first auxiliary chamber 22, which is formed in the auxiliary cylinder 21 between the lid 11 and the auxiliary piston 19, from a second auxiliary chamber 23, which is formed in the cylinder 2 between the auxiliary piston 19 and the piston 13.

The outer diameter of the auxiliary piston 21 is smaller than the internal diameter of the cylinder 2, with the result that an annular chamber 24 is formed radially between the cylinder 2 and the auxiliary cylinder 21. In the example embodiment illustrated, the annular chamber 24 is configured so that the cylinder 2 has an enlarged cross section in its upper end section 20.

A first duct 25 penetrates the lid 11 and connects the interior of the auxiliary cylinder 21 to a first port 27 of a valve 26 which may be electromagnetically switchable. A second port 28 of this valve 26 is connected to a second duct 29, which is also formed in the lid 11 and communicates with the annular chamber 24. The valve 26 has an open position I which permits a relatively unthrottled exchange of fluid between the auxiliary spaces 22 and 23, and a shut-off position II in which the flow from the interior of the auxiliary cylinder 21 to the annular chamber 24 is shut off.

If the vibration damper 1 experiences rebound travel or extensions, the piston rod 3 performs an out-stroke relative to the cylinder 2. As long as the rebound 18 does not counteract this extension movement, the out-stroke of the piston rod 3 is in an idle-stroke range for the rebound 18. However, as soon as the rebound 18 can counteract the extension movement of the piston rod 3, the out-stroke is in a working-stroke range for the rebound 18. The out-stroke at which the idle-stroke ends and the working-stroke begins forms a point of application for the rebound 18.

In a vehicle having a ride control device, the piston 13 is in a lowered ride level, which is designated as an on-road level, for example, in a position designated by A relative to the cylinder 2. Starting from this position A, the piston 13 or the piston rod 3 performs out-strokes or in-strokes. In the home position in which the piston 13 is located in the position A and which corresponds to a minimum out-stroke, the auxiliary piston 19 is arranged at the position B. In an out-stroke, the piston 13 moves towards the lid 11, in which process the auxiliary piston 19 approaches the auxiliary cylinder 21. In the idle-stroke range, no significant forces can act on the auxiliary piston 19. Given a sufficiently large out-stroke, the auxiliary piston 19 then moves into the auxiliary cylinder 21 and thus closes off the interior of the auxiliary cylinder 21 on the side facing the piston 13, i.e., the first auxiliary chamber 22. If the vehicle is at its on-road level, the valve 26 is located in its shut-off position II, with the result that the hydraulic volume enclosed in the first auxiliary chamber 22 cannot overflow via the valve 26 into the annular chamber 24, i.e., into the second auxiliary chamber 23. Because the hydraulic fluid is incompressible, the point of application of the rebound spring 18 is thus at a position C in which the auxiliary piston 19 closes off the auxiliary cylinder 21. The idle-stroke at the on-road level $H_{ON}$ thus corresponds to the axial difference between the positions B and C. The maximum out-stroke is reached if the rebound spring 18 is shortened to block.

If the vehicle is at a raised level, which is designated here as off-road level, the piston 13 is arranged, for example, at a position D relative to the cylinder 2. If the valve 26 is closed off as the ride level is raised, this leads to considerable biasing of the rebound spring 18 because the auxiliary piston 19 is then locked in the position C. However, when the valve 26 is opened, the hydraulic volume can overflow from the first auxiliary chamber 22 into the second auxiliary chamber 23, as a result of which the auxiliary piston 19 is arranged at a position E relative to the cylinder 2. Given an out-stroke when the valve 26 is open (switched position I), the piston 13 and auxiliary piston 19 may be adjusted in the direction of the lid 11. At the end of the idle travel, the auxiliary piston 19 strikes the lid 11, with the result that the point of application of the rebound spring 18 is then formed on the lid 11 at the position F. The length of the idle-stroke at the off-road level $H_{OFF}$, i.e., the axial distance between the positions E and F, may be precisely of the same magnitude as that of the idle-stroke $H_{ON}$ at the on-road level.

It is clear that other idle-stroke lengths may also be set for other level settings. In addition, the valve 26 may be switched, for example, as a function of the stroke, so that basically any desired positions may be set and locked between the positions C and F for the auxiliary piston 19 in the auxiliary cylinder 21. In accordance with the valve 26, the hydraulic volume may be set in the first auxiliary chamber 22, as a result of which the point of application of the rebound spring 18 may simultaneously be adjusted.

Figure 2:
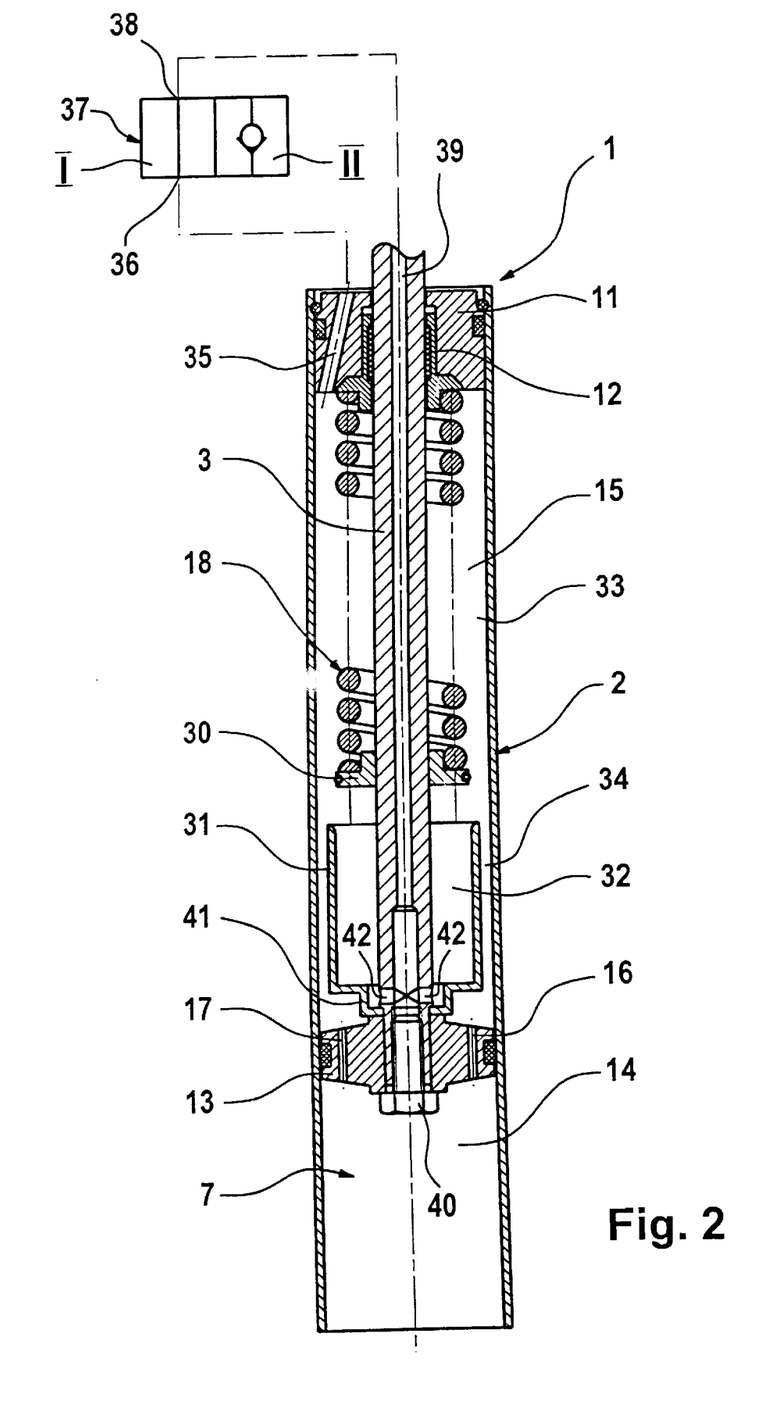

As illustrated in FIG. 2, the rebound spring 18 may also be secured by one of its ends to the lid 11. In this example embodiment, an auxiliary piston 30 having an external diameter that is smaller than the internal diameter of the cylinder 2 is formed on an end of the rebound spring 18 facing the piston 13. An auxiliary cylinder 31 having an external diameter that is smaller than the internal diameter of the cylinder 2 having an internal diameter that corresponds approximately to the external diameter of the auxiliary piston 30 is formed on the piston 13. As a result, an annular chamber 34 which can freely be flowed through is formed radially between the auxiliary cylinder 31 and the cylinder 2. The auxiliary piston 30 which has been retracted into the auxiliary cylinder 31 thus separates, in the upper working chamber 15 penetrated by the piston rod 30, a first auxiliary chamber 32, which is formed in the auxiliary cylinder 31 between the piston 13 and the auxiliary piston 30, from a second auxiliary chamber 33, which is formed in the cylinder 2 between the lid 11 and the auxiliary piston 30.

The lid 11 includes a duct 35 which connects the upper working chamber 15 or the second auxiliary chamber 33 to a first port 36 of a valve 37. A second port 38 of this valve 37 is connected to a duct 39 which is formed centrally in the interior of the piston rod 3. This duct 39 is closed off at its end facing the piston 13 by a screw 40. The auxiliary cylinder 31 includes, at its base facing the piston 13, an annular step 41 into which radial orifices 42 of the piston rod 3 open, with the result that the duct 39 communicates with the interior of the auxiliary cylinder 31 via these orifices 42.

The valve 37 may be electrically switchable and includes an open position I (illustrated in FIG. 2) in which the interior of the auxiliary cylinder 31, i.e., the first auxiliary chamber 32, communicates in an unimpeded fashion with the upper working chamber 15, i.e., with the second auxiliary chamber 33. In addition, the valve 37 includes a closed position II in which the flow from the first auxiliary chamber 32 through the valve 37 to the second auxiliary chamber 33 is shut off.

As long as the auxiliary piston 30 moves outside the auxiliary cylinder 31, there may be a free flow around the auxiliary piston 30, with the result that the rebound spring 18 does not counteract an out-stroke of the piston rod 3. As soon as the auxiliary piston 30 retracts into the auxiliary cylinder 31 during an out-stroke, the auxiliary volume in the first auxiliary chamber 32 is closed off on the side facing the lid 11. When the valve 37 is open, the auxiliary piston 30 may penetrate deeper into the auxiliary cylinder 31 with a greater out-stroke, in which case it expels the hydraulic fluid from the first auxiliary chamber 32 and drives it into the second auxiliary chamber 33. If the valve 37 is closed, the incompressible hydraulic volume enclosed in the first auxiliary chamber 32 blocks a greater adjustment of the auxiliary piston 30 with the result that the rebound spring 18 is supported on the piston 13 by the enclosed hydraulic volume in the working-stroke range.

The closing time for the valve 37 may be selected as a function of the ride level and as a function of the out-stroke, allowing the positioning of the auxiliary piston 30 to be set and locked within the auxiliary cylinder 31. The setting point for the rebound spring 18 is determined with the positioning for the auxiliary piston 30.

Figure 3:
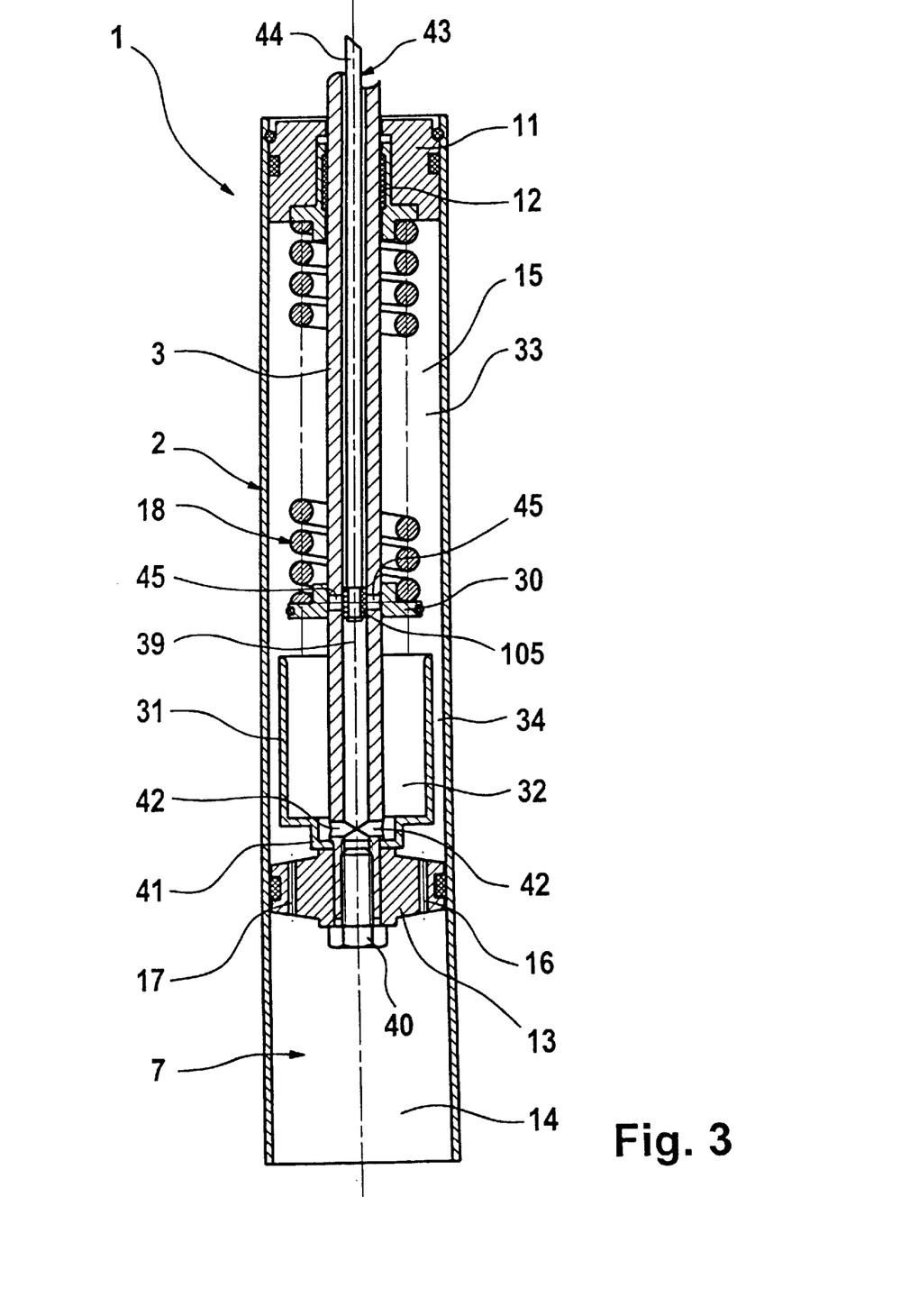

The example embodiment illustrated in FIG. 3 is substantially of the same design as the example embodiment illustrated in FIG. 2. However, whereas the example embodiment illustrated in FIG. 2 operates with an external valve 37, an internal valve 43 is used in the example embodiment illustrated in FIG. 3. This internal valve 33 includes a switching rod 44 which controls axial orifices 45 in the piston rod 3 with its axial end. These orifices 45 are positioned in the second auxiliary chamber 33 and in the upper working chamber 15 outside the auxiliary cylinder 31 and permit a flow around the auxiliary piston 30 at the latest when it is retracted into the auxiliary cylinder 31. In order to achieve the necessary sealing effect, the switching rod 44 is fitted at its end with a sealing sleeve 105 which interacts with the orifices 45. The example embodiment illustrated in FIG. 3 otherwise operates substantially in the same way as the example embodiment illustrated in FIG. 2.

Figure 4:
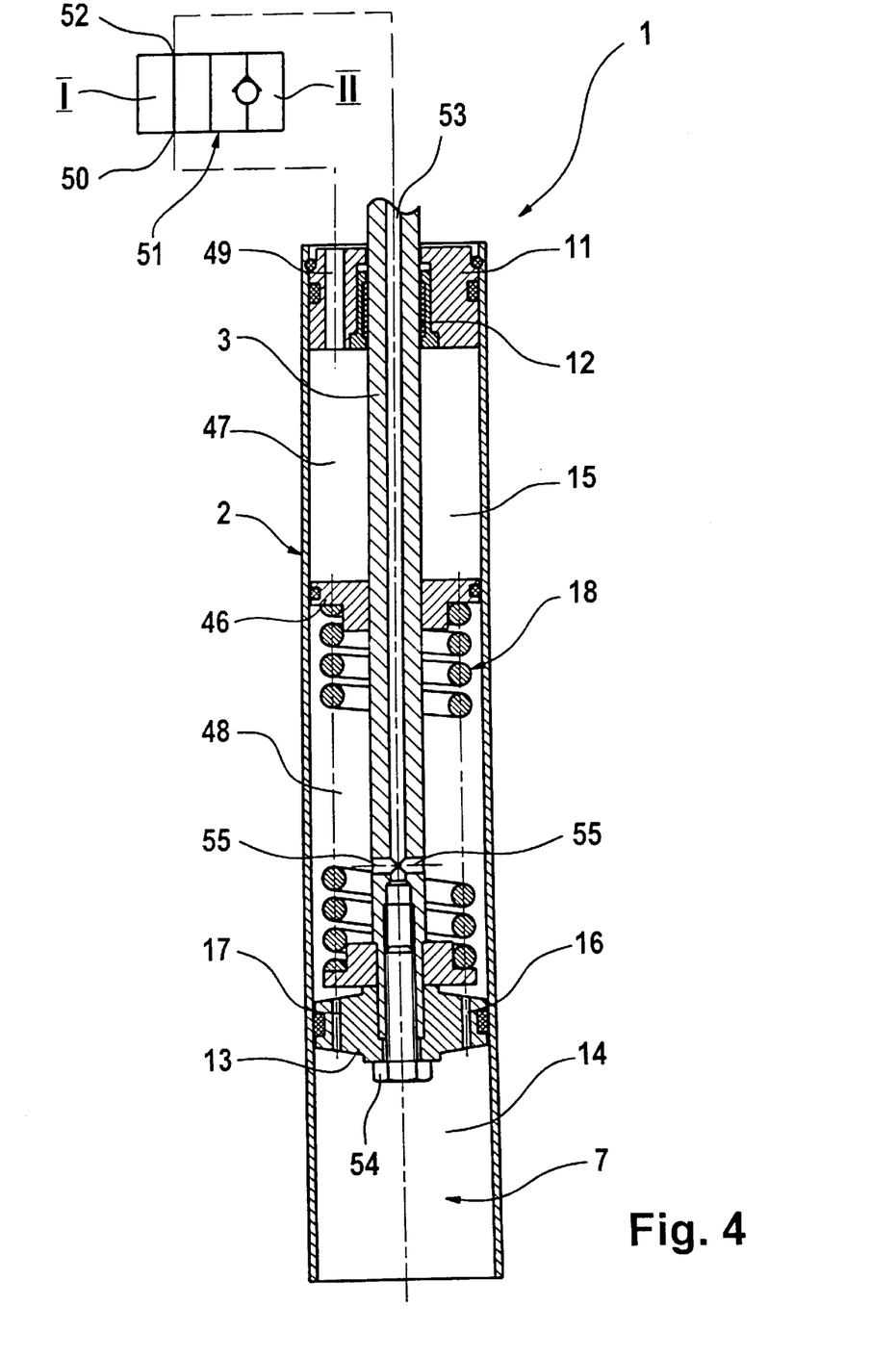

As illustrated in FIG. 4, the rebound spring 18 may be mounted, at its end facing away from the lid 11, on the piston 13. At its end facing the lid 11, an auxiliary piston 46, the external diameter of which bears in a sealed fashion against the internal diameter of the cylinder 2, is formed on the rebound spring 18. The auxiliary piston 46 thus separates, in the upper working chamber 15 penetrated by the piston rod 3, a first auxiliary chamber 47, which is enclosed between the lid 11 and the auxiliary piston 46, from a second auxiliary chamber 48, which is enclosed between the auxiliary piston 46 and the piston 13.

The lid 11 includes a duct 49 which connects the first auxiliary chamber 47 to a first port 50 of an electrically switching valve 51. A second port 52 of this valve 51 is connected to a port 53 which is arranged centrally in the interior of the piston rod 3. This duct 53 is also closed off at its end facing the piston 13 by a screw 54 and includes in the section of the second auxiliary chamber 48, radial orifices 55 through which the duct 53 communicates with the second auxiliary chamber 48.

The valve 52 includes an open position I (shown in FIG. 4) in which the first auxiliary chamber 47 communicates with the second auxiliary chamber 48, and a closed position II, in which the flow from the first auxiliary space 47 to the second auxiliary space 48 is shut off.

In an out-stroke of the piston rod 3 relative to the cylinder 2, the piston 13 moves toward the lid 11. The rebound spring 18 is supported on the piston 13 and on the auxiliary piston 46, with the result that the movement of the piston 13 is transmitted to the auxiliary piston 46. If the valve 51 is located in its open position I, the auxiliary piston 46 may reduce the volume of the first auxiliary chamber 47 and expel the hydraulic medium contained therein into the second auxiliary chamber 48 via the valve 51. When the valve 51 is open, the rebound spring 18 cannot counteract the out-stroke of the piston rod 13 as long as the auxiliary piston 46 does not bear axially against the lid 11. However, as soon as the valve 51 assumes its closed position II, the incompressible hydraulic volume causes, in the first auxiliary chamber 47, securing of the position of the auxiliary piston 46 relative to the cylinder 2, as a result of which the resetting effect of the rebound spring 18 counteracts a further extension movement of the piston rod 3.

Because the positioning and locking of the auxiliary piston 46 relative to the cylinder 2 may be selected as desired by an appropriate activation of the valve 51, numerous setting variants for the point of application of the rebound 18 are obtained. For example, the value zero may also be set for the idle-stroke of the rebound 18, with the result that the rebound 18 counteracts the piston rod 3 even with a minimum extension movement.

Figure 5:
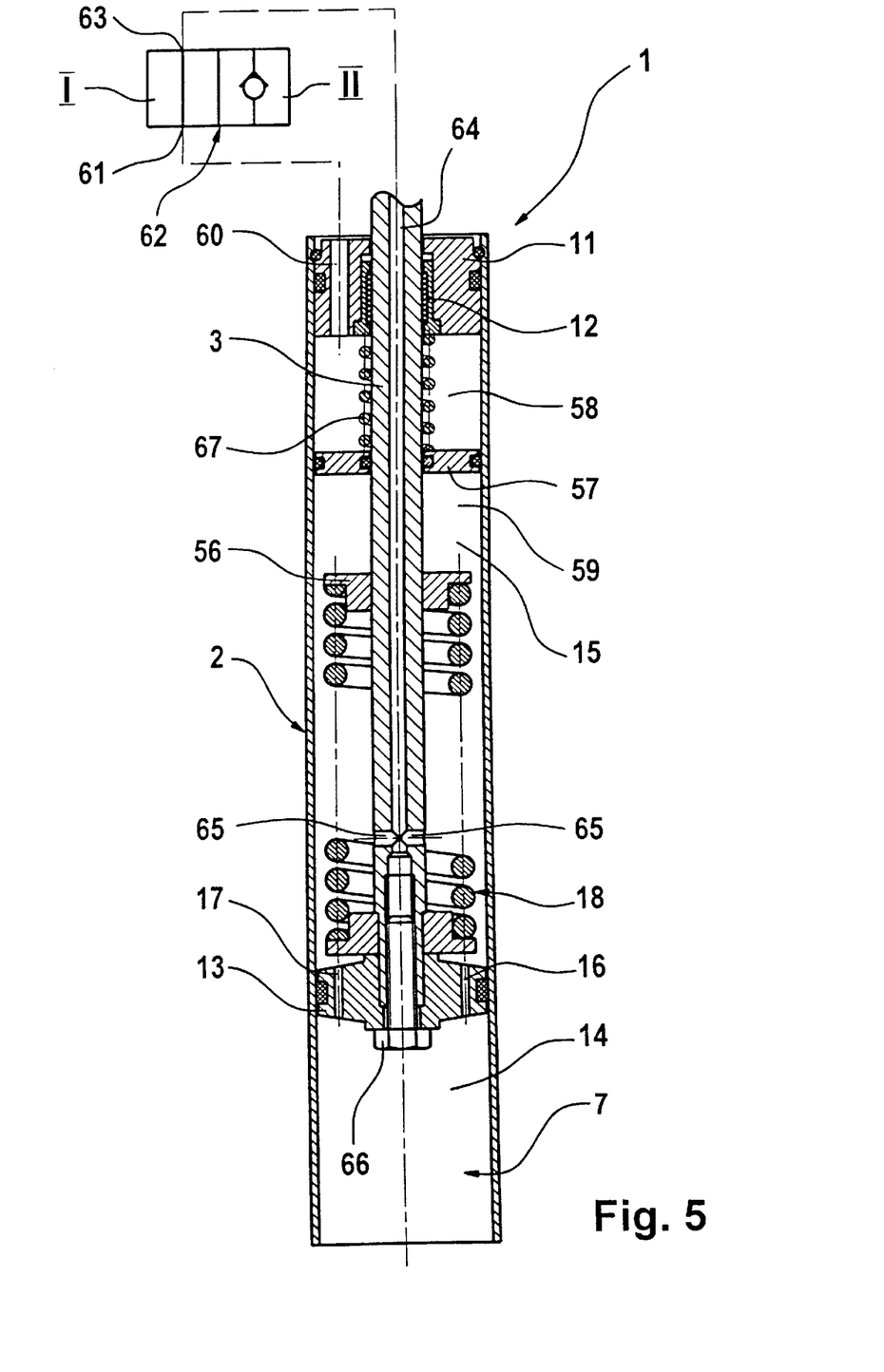

In a further example embodiment, illustrated in FIG. 5, the rebound spring 18 is mounted, at its end facing away from the lid 11, again on the piston 13, while it is fitted at its other end facing the lid 11 with a stop ring 56. This stop ring 56 includes an external diameter which is smaller than the internal diameter of the cylinder 2, with the result that there may be a free flow around the stop ring 56.

In the upper working chamber 15 which is penetrated by the piston rod 3, an auxiliary piston 57 having an internal diameter that bears in sealed fashion against the piston rod 3 and having an external diameter that bears in sealed fashion against the cylinder 2 is arranged between the stop ring 56 and the lid 11. This auxiliary piston 57 separates, in the upper working chamber 15, a first auxiliary space 58, which is axially enclosed between the lid 11 and the auxiliary piston 57, from a second auxiliary space 59, which is axially bounded between the auxiliary piston 57 and the piston 13. In the lid 11, a duct 60 is formed which connects a first port 61 of a electromechanically switchable valve 62 to the first auxiliary chamber 58 in a communicating fashion. A second port 63 of the valve 62 is connected to a duct 64 which is formed concentrically in the interior of the piston rod 3 and communicates with the second auxiliary chamber 59 via radial orifices 65. The duct 64 is closed off in a sealed fashion at its end facing the piston 13 by a screw 66. The valve 62 includes an open position I (illustrated in FIG. 5) and a closed position II, which interrupts the communicating connection between the first auxiliary chamber 58 and the second auxiliary chamber 59.

In the first auxiliary chamber 58, it is possible to optionally arrange a helical compression spring 63 which urges the auxiliary piston 57 from the lid 11.

In an out-stroke of the piston rod 3 relative to the cylinder 2, the piston 13 moves towards the lid 11. This movement is transmitted to the stop ring 56 via the rebound spring 18. Given a sufficient out-stroke, the stop ring 56 comes to bear against the auxiliary piston 57. As long as the valve 62 is in its open position I, a further extension movement merely causes the hydraulic volume of the first auxiliary chamber 58 to be expelled into the second auxiliary chamber 59. However, as soon as the valve 62 is switched into its closed position II, the incompressible hydraulic volume blocks a greater axial adjustment of the auxiliary piston 57, with the result that the rebound spring 18 is supported, by its stop ring 56, on the auxiliary piston 57, and on the lid 11 by means of the hydraulic volume enclosed in the first auxiliary chamber 58. The rebound spring 18 thus counteracts a further extension movement of the piston rod 3.

The positioning of the auxiliary piston 57 within the cylinder 2 may be selected, as a result of which the point of application of the rebound spring 18 is correspondingly selectable. The optionally provided spring 67 permits an automatic resetting movement of the auxiliary piston 57 particularly easily.

Figure 6:
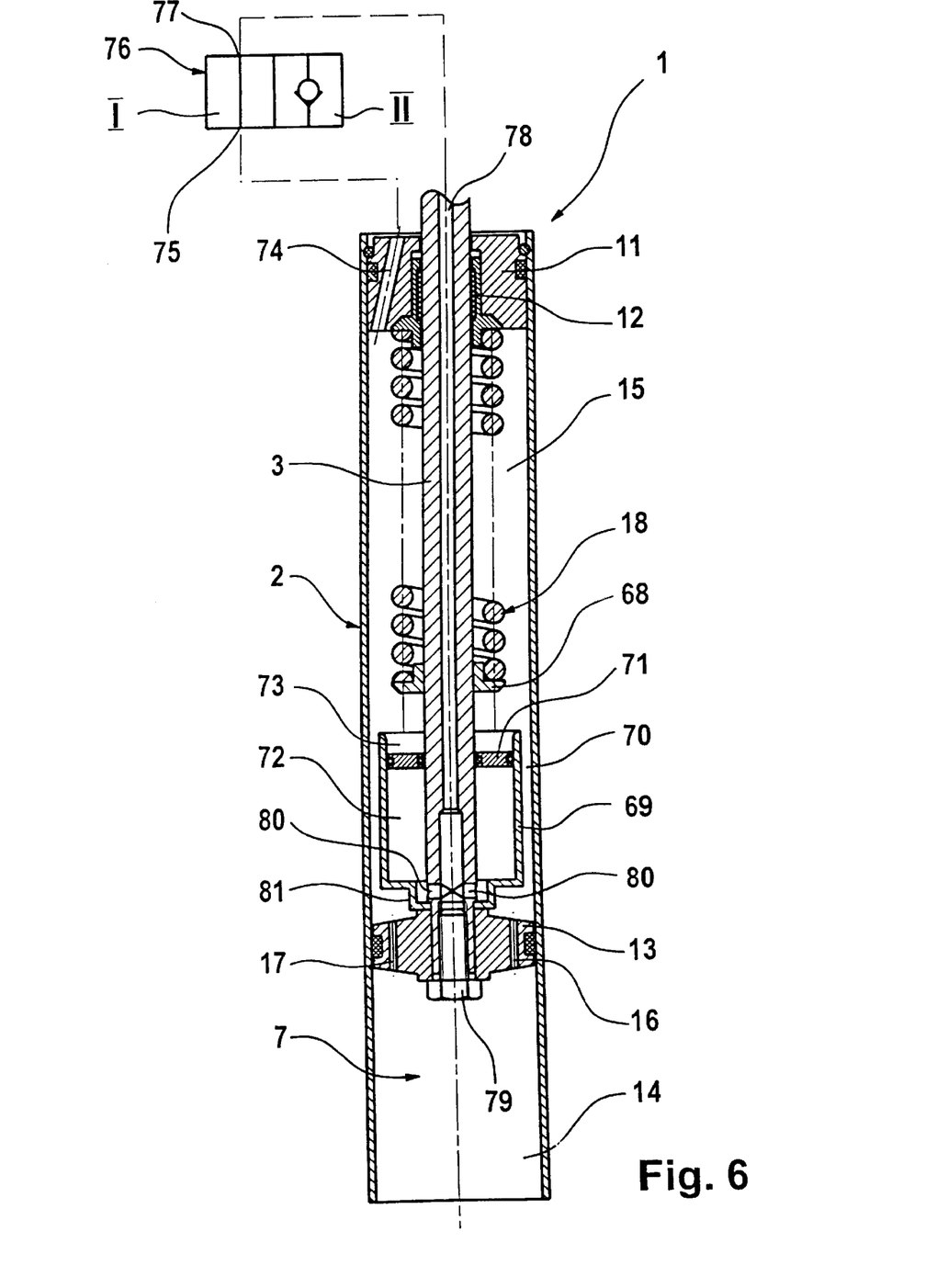

In the example embodiment illustrated in FIG. 6, the rebound spring 18 is secured at its end facing away from the piston 13 to the lid 11. At its end facing the piston 13, the rebound spring 18 includes a stop ring 68 having an external diameter that is smaller than the internal diameter of the cylinder 2. An auxiliary cylinder 69 having an external diameter that is smaller than the internal diameter of the cylinder 2 is formed on the piston 13, with the result that an annular chamber 70 is formed between the auxiliary cylinder 69 and the cylinder 2. An auxiliary piston 71 is mounted so as to be axially adjustable in the interior of the auxiliary cylinder 69, the internal diameter of which auxiliary piston 71 bears in sealed fashion against the piston rod 3 and the external diameter of which bears in sealed fashion against the auxiliary cylinder 69. The internal diameter of the auxiliary cylinder 69 is greater than the external diameter of the stop ring 68.

The auxiliary piston 71 separates, in the auxiliary cylinder 69, a first auxiliary chamber 72, which is formed in the interior of the auxiliary cylinder 69 between the auxiliary piston 71 and the piston 13, from a second auxiliary chamber 73, which is open towards the upper working chamber 15 and is formed between the auxiliary piston 71 and the lid 11.

The lid 11 includes a duct 74 which is connected by a first port 75 of an electrically activated valve 76. A second port 77 of this valve 76 is connected to a duct 78 which is formed concentrically in the interior of the piston rod 3. The valve 76 includes an open position I (illustrated in FIG. 6) and a closed position II, in which a flow from the duct 78 to the duct 74 is shut off. The duct 78 is closed off in sealed fashion at its end facing the piston 13 by a screw 79 and is connected to the first auxiliary chamber 72 via radial orifices 80 which are positioned in an axial shoulder 81 of the auxiliary cylinder 69.

In an out-stroke of the piston rod 3 relative to the cylinder 2, the piston 13, and thus the auxiliary cylinder 69 secured thereto, move closer to the stop ring 68. Given a sufficient out-stroke, the stop ring 68 comes to bear against the auxiliary piston 71. If the valve 76 is switched into its open position I, a further extension movement of the piston rod 3 causes an axial adjustment of the auxiliary piston 71 in the direction of the piston 13. In the process, the auxiliary piston 71 expels the hydraulic medium from the first auxiliary chamber 72 via the valve 76 into the upper working chamber 15. As soon as the valve 76 assumes its closed position II, the incompressible hydraulic volume enclosed in the first auxiliary chamber 72 causes the position of the auxiliary piston 71 to be locked relative to the cylinder 69. As a result, the rebound spring 18 may be supported by its stop ring 68 on the auxiliary piston 71 and thus on the floor of the auxiliary cylinder 69 or on the piston 13 by the hydraulic volume enclosed in the first hydraulic chamber 72.

The relative position of the auxiliary piston 71 with respect to the auxiliary cylinder 69 may be set, as a result of which the point of application of the rebound spring 18 may also be selected.

Figure 7:
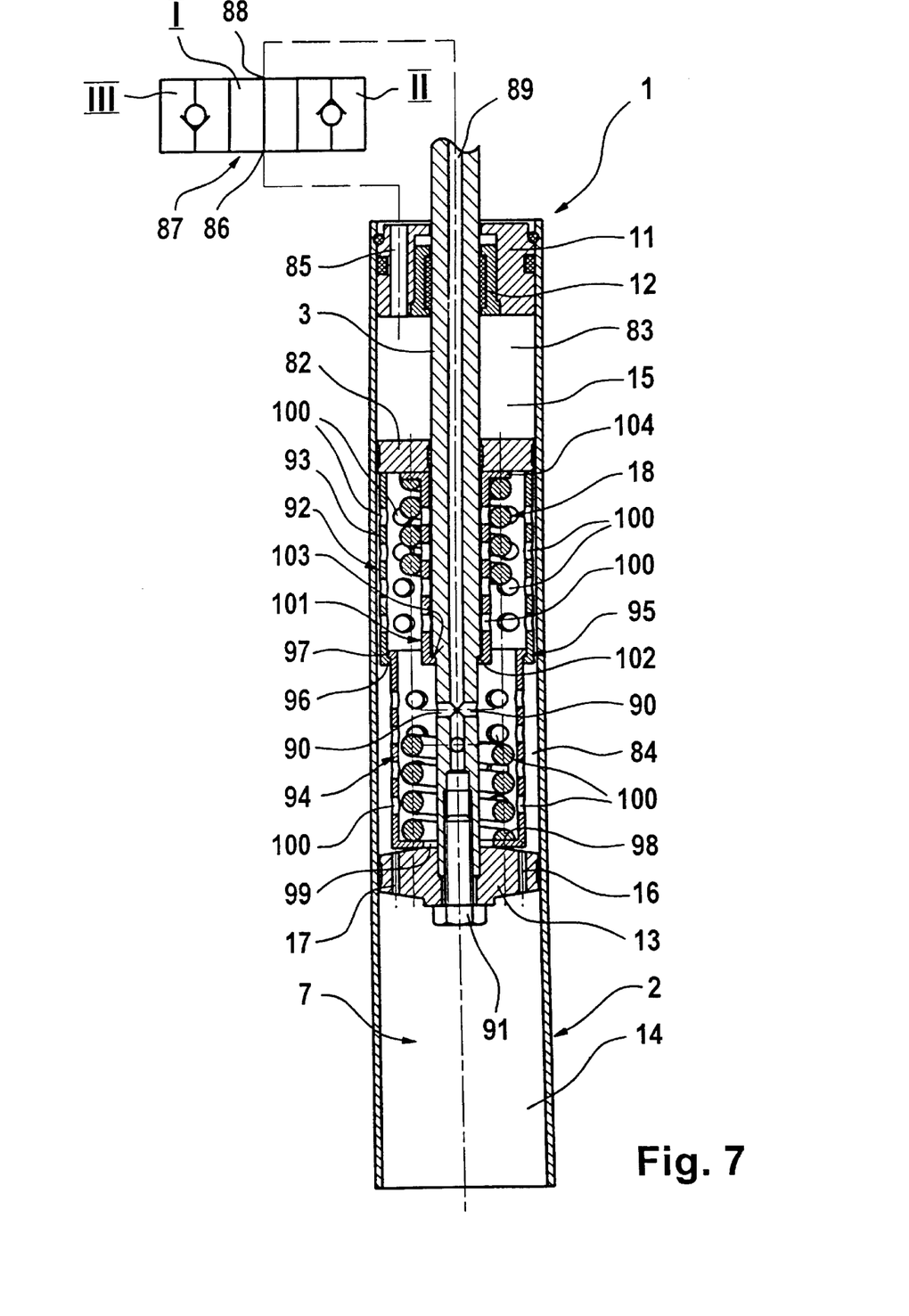

In the example embodiment illustrated in FIG. 7, an auxiliary piston 82 is mounted so as to be axially adjustable in the working chamber 15 penetrated by the piston rod 3, the internal diameter of which auxiliary piston 82 is mounted in a sealed fashion against the piston rod 3 and the external diameter of which is mounted in sealed fashion against the cylinder 2. This auxiliary piston 82 separates, in the upper working chamber 15, a first auxiliary chamber 83, which is axially bounded by the lid 11 and the auxiliary piston 82, from a second auxiliary chamber 84 which is axially bounded between the auxiliary piston 82 and the piston 13. The lid 11 includes a duct 85 which connects the first auxiliary chamber 83 to a first port 86 of an electrically switchable valve 87. A second port 88 of the valve 87 is connected to a duct 89 which extends concentrically in the interior of the piston rod 3. This duct 89 opens via radial orifices 90 into the second auxiliary chamber 84. An end of the duct 89 facing the piston 13 is closed off in sealed fashion with a screw 91. The valve 87 includes three switched positions, namely an open position I, in which the auxiliary chambers 83 and 84 communicate with one another via the valve 87, a rebound position II, in which a flow of hydraulic medium from the first auxiliary chamber 83 to the second auxiliary chamber 84 is blocked, and a pressure stop position III in which flow of hydraulic medium from the second auxiliary chamber 84 to the first auxiliary chamber 83 is blocked.

An outer sleeve 92 having an external diameter that is smaller than the internal diameter of the cylinder 2 is mounted on the auxiliary piston 82, on the side facing the piston 13, with the result that an annular gap 93 is formed between the outer sleeve 92 and the cylinder 2. An inner sleeve 94 is mounted so as to be axially adjustable in the outer sleeve 92, the maximum extension position (illustrated in FIG. 7) of the inner sleeve 94 relative to the outer sleeve 92 is bounded by an end stop 95. This end stop 95 is formed, for example, by an inner collar 96 which projects radially inwardly at the outer sleeve 92, at its end facing away from the auxiliary piston 82, and an outer collar 97 which interacts in a positively locking way therewith and which is formed on the inner sleeve 94 at the end facing the auxiliary piston 82 and protrudes radially outwardly.

At its end facing away from the auxiliary piston 82, the inner sleeve 94 includes a supporting collar 98 which protrudes radially inwardly. The rebound spring 18 is supported on this supporting collar 98 on the axial side facing the auxiliary piston 82, while the axial side of the supporting collar 98 which faces away from the auxiliary piston 82 bears against the piston 13 as illustrated in FIG. 7. The supporting collar 98 is provided with a central orifice 99 in which the piston rod 3 is axially freely adjustable. Both the outer sleeve 92 and the inner sleeve 94 include a plurality of radial orifices 100, with the result that an inner chamber formed between the two sleeves 92, 94 and the piston rod 3 may communicate in a relatively unimpeded fashion with an outer chamber formed between the two sleeves 92, 94 and the cylinder 2.

The end of the rebound spring 18 facing away from the piston 13 is supported on a ring-shaped end 104 of a central sleeve 101 which itself comes to bear against the auxiliary piston 82 in the position illustrated in FIG. 7. At its end facing away from the auxiliary piston 82, the central sleeve 101 includes a radially inwardly projecting annular collar 102, which interacts with a radially outwardly projecting annular step 103 on the piston rod 3. The central sleeve 101 is mounted on the piston rod 3 in an axially adjustable fashion and also includes a plurality of radial orifices 100.

The positioning of the annular step 103 and the axial extent of the central sleeve 101 may be selected so that the ring end 104 of the central sleeve 101 comes to bear against the auxiliary piston 82 precisely when the piston 13 also comes to bear against the supporting collar 98 of the inner sleeve 94.

In an out-stroke of the piston rod 3 relative to the cylinder 2, the piston 13 moves toward the lid 11. The piston 13 comes to bear against the supporting collar 98 of the inner sleeve 94 and drives it. By the rebound spring 18, the inner sleeve 94 is supported on the ring end 104 of the central sleeve 101, which is itself supported on the auxiliary piston 82. Accordingly, the stroke movement of the piston 13 is transmitted to the auxiliary piston 82.

If the valve 87 is switched into its open position I or into its pressure stop position III, the auxiliary piston 82 may expel the hydraulic volume from the first auxiliary chamber 83 via the valve 87 and into the second auxiliary chamber 84. The rebound spring 18 is then in the idle-stroke range and cannot counteract the out-stroke. However, if the valve 87 is in its rebound position II, the hydraulic volume is enclosed in the first auxiliary chamber 83, and the auxiliary piston 82 is blocked in its relative position with respect to the cylinder 2. Given a greater outward movement of the piston, the inner sleeve 94 then moves into the outer sleeve 92, the rebound spring 18 then being stretched and counteracting the stroke movement. In a corresponding manner, the piston rod 3 is also adjusted relative to the central sleeve 101, the annular collar 102 and annular step 103 moving away from one another.

Given an in-stroke, the piston rod 3 moves downwardly in accordance with FIG. 7, with the result that the annular step 103 and annular collar 102 approach one another. In the process, the inner sleeve 94 simultaneously moves out of the outer sleeve 92. As soon as the annular step 103 engages on the annular collar 102, the piston rod 103 moves the central sleeve 101 along. The central sleeve 101 is supported on the inner sleeve 94 by the rebound spring 18 and, by the stop 95, it drives along the outer sleeve 92 and thus the auxiliary piston 82. If the valve 87 is in its open position I or in its rebound position II, hydraulic medium may overflow over from the second auxiliary chamber 84 into the first auxiliary chamber 83, with the result that the auxiliary piston 82 may follow the in-stroke of the piston rod 3.

However, as soon as the valve 87 is switched into its pressure stop position III, a flow of fluid from the second auxiliary chamber 84 to the first auxiliary chamber 83 is shut off, and the auxiliary piston 82 is locked relative to the cylinder 2. Given a greater retraction movement of the piston rod 3, the central sleeve 101 thus moves away from the auxiliary cylinder 82 and the inner sleeve 94 moves away from the piston 13. As a result, the axial ends of the rebound spring 18 are moved toward one another, causing the rebound spring 18 to be stressed and serve as a pressure stop spring and thus counteract the retraction movement of the piston rod.

The relative position of the auxiliary piston 82 with respect to the cylinder 2 may be selected in a relatively unconstrained way, as a result of which the point of application of the stop 18 can be set both in the "traction mode" and also in the "pressure mode".

In the shut-off settings II of the valves of the example embodiments illustrated in FIGS. 1, 2, 4, 5, 6 and in the rebound setting II and the pressure stop setting III of the valve 87 illustrated in FIG. 7, the valves each have a return function, with the result that just one direction of flow is shut off while the other direction of flow is throttled to a greater or lesser extent.

In the example embodiments illustrated, ducts are formed in the lids 11. Some of these ducts may also be replaced by radial connections to the cylinder 2.

In another example embodiment of the present invention, the lid 11 is designed so as to be axially adjustable relative to the cylinder 2, with the result that the point of application of the rebound 18 may be set by the positioning of the lid 11.

What is claimed is:

1. A vibration damper, comprising:

a cylinder;

a rebound device;

an axially movable piston rod;

a piston provided on the piston rod, the piston separating the cylinder into two working chambers, a first one of the two working chambers being penetrated by the piston rod and containing the rebound device; and a lid closing the first one of the two working chambers;

wherein an out-stroke of the piston rod relative to the cylinder includes:

an idle-stroke between a minimum out-stroke and a position in which the rebound device does not counteract movement of the piston rod;

a working-stroke between a position in which the rebound device counteracts movement of the piston rod and a maximum out-stroke; and a point of application at which the idle-stroke ends and the working-stroke begins;

the vibration damper including a first arrangement configured to provide selective adjustment of the point of application.

2. The vibration damper according to claim 1, wherein the rebound device includes a spring.

3. A vibration damper, comprising:

a cylinder;

a rebound device;

an axially movable piston rod;

a first piston provided on the piston rod, the first piston separating the cylinder into two working chambers, a first one of the two working chambers being penetrated by the piston rod and containing the rebound device; and a lid closing the first one of the two working chambers;

wherein an out-stroke of the piston rod relative to the cylinder includes:

an idle-stroke between a minimum out-stroke and a position in which the rebound device does not counteract movement of the piston rod;

a working-stroke between a position in which the rebound device counteracts movement of the piston rod and a maximum out-stroke; and a point of application at which the idle-stroke ends and the working-stroke begins;

the vibration damper including a first arrangement configured to adjust the point of application; and wherein the first arrangement includes an auxiliary piston arranged in the cylinder and adjustable relative to the piston rod and to the cylinder, the rebound device being one of directly supported and indirectly supported on one of the lid and the first piston by the auxiliary piston at least during the working-stroke; and wherein the first arrangement is configured to at least one of adjust and lock a relative position between the auxiliary piston and one of the piston rod and the cylinder.

4. The vibration damper according to claim 3, further comprising an actuator drive, the auxiliary piston being coupled to the actuator drive, the actuator drive being configured to position and lock the auxiliary piston relative to the piston rod, the auxiliary piston being adjustable relative to the cylinder.

5. The vibration damper according to claim 3, further comprising an actuator drive, the auxiliary piston being coupled to the actuator drive, the actuator drive being configured to position and lock the auxiliary piston relative to the cylinder, the auxiliary piston being adjustable relative to the piston rod.

6. The vibration damper according to claim 3, wherein the auxiliary piston axially separates the first one of the two working chambers into a first auxiliary chamber and a second auxiliary chamber;
the vibration damper further comprising a second arrangement configured to adjust a hydraulic volume of one of the first and second auxiliary chambers supporting the auxiliary piston on the one of the lid and the first piston in accordance with a hydraulic volume of the working-stroke.

7. The vibration damper according to claim 6, wherein the second arrangement includes a flow path, the first auxiliary chamber and the second auxiliary chamber being in fluid communication via the flow path, the vibration damper further comprising a valve arranged in the flow path, the valve being configured to close the flow path in at least one direction.

8. The vibration damper according to claim 7, wherein the flow path includes a duct extending in the piston rod.

9. The vibration damper according to claim 3, wherein the auxiliary piston includes a separate piston.

10. The vibration damper according to claim 3, wherein the auxiliary piston is provided on the lid.

11. The vibration damper according to claim 3, wherein the auxiliary piston is provided at an axial end of the rebound device.

12. The vibration damper according to claim 3, further comprising an auxiliary cylinder provided in the cylinder, the auxiliary piston being adjustably arranged in the auxiliary cylinder.

13. The vibration damper according to claim 12, wherein the hydraulic volume of the working-stroke range is bounded in the auxiliary cylinder by the auxiliary piston and one of the first auxiliary chamber and the second auxiliary chamber in which the auxiliary piston is supported on the one of the lid and the first piston.

14. The vibration damper according to claim 3, wherein the auxiliary piston is settable in at least two different positions, each of the at least two different positions corresponding to a respective point of application.

* * * * *